Jan. 16, 1968  F. L. TAYLOR  3,363,402
CONTROL SYSTEM FOR ELECTRICAL PRECIPITATORS
Filed Aug. 7, 1964
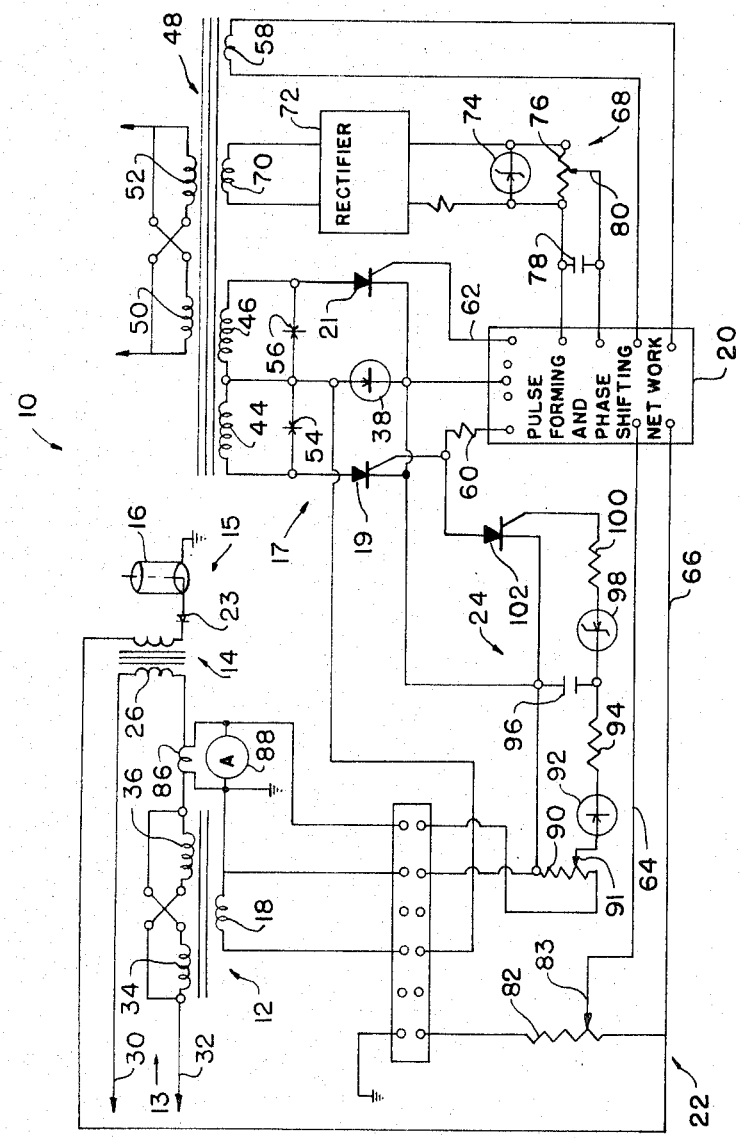
INVENTOR.
FRANK L. TAYLOR
BY Whittemore,
Hulbert & Belknap
ATTORNEYS United States Patent Office 3,363,402
Patented Jan. 16, 1968

3,363,402
CONTROL SYSTEM FOR ELECTRICAL
PRECIPITATORS
Frank L. Taylor, Franklin, Mich., assignor to The Detroit
Edison Company, Detroit, Mich., a corporation of New
York
Filed Aug. 7, 1964, Ser. No. 388,069
13 Claims. (Cl. 55—105)

ABSTRACT OF THE DISCLOSURE

An automatic fly ash precipitator control wherein the precipitator is energized by a transformer comprising a saturable reactor in series with the primary winding of the transformer and full wave rectifier means for regulating the control winding of the saturable reactor in accordance with the spark rate and current of the precipitator. The output of both sides of the full wave rectifier is controlled in accordance with the current through the precipitator by shifting the phase of the trigger signals to silicon controlled rectifiers in the full wave rectifier, while the output of the full wave rectifier is controlled in accordance with the spark rate of the precipitator by cutting off one of the silicon controlled rectifiers of the full wave rectifier.

---

The invention relates to automatic precipitator controls and refers more specifically to solid state structure for controlling the current and spark rate of fly ash precipitators or the like.

In the past automatic precipitator controls for controlling precipitator current and spark rate simultaneously to provide optimum operation of a precipitator have been relatively complicated so that they have been expensive, both in initial cost and in maintenance. In addition, prior precipitator current and spark rate controls have been larger than desirable and unnecessarily sensitive to conditions such as temperature at the point of installation.

It is therefore one of the objects of the invention to provide an improved automatic precipitator control for fly ash precipitators or the like.

Another object is to provide an automatic precipitator control including improved structure for controlling the precipitator current.

Another object is to provide an automatic precipitator control including improved structure for controlling the precipitator spark rate.

Another object is to provide an automatic precipitator control including saturable reactor field windings in the primary precipitator power input circuit, a pair of silicon controlled rectifiers connected in a full wave rectifier circuit, means for applying the output of the full wave rectifier to a control winding of the saturable reactor for varying the impedance of the field windings in the precipitator power input circuit, pulse forming and phase shifting means for providing gating signals for the silicon controlled rectifiers, means for varying the phase of the gating signals in accordance with precipitator current and means for controlling the output of one of the silicon controlled rectifiers in response to the spark rate of the precipitator.

Another object is to provide structure as set forth above wherein the means for varying the phase of the gating signals for the silicon controlled rectifiers in accordance with the precipitator current includes means for shunting a portion of the precipitator secondary power input circuit current through the pulse forming and phase shifting network.

Another object is to provide structure as set forth above wherein the means for controlling the output of one of the silicon controlled rectifiers in response to the spark rate of the precipitators comprises means for developing signals at the spark rate of the precipitator, means for integrating the signals and means for rendering one of the silicon controlled rectifiers non-conducting in response to a spark rate above a predetermined spark rate.

Another object is to provide an automatic precipitator control which is simple, economical and efficient.

Other objects and features of the invention will become apparent as the description proceeds, especially when taken in conjunction with the accompanying drawing, illustrating a preferred embodiment of the invention, wherein:

The figure is a partly schematic, partly block diagram of an automatic precipitator control constructed in accordance with the invention.

With particular reference to the figure of the drawing, one embodiment of the present invention will now be considered in detail.

As shown in the figure, the automatic precipitator control 10 comprises the saturable reactor 12 for controlling the input electric current to the primary circuit 13 of power transformer 14, the secondary circuit 15 of which is connected through a high voltage rectifier 23 to precipitator 16. The automatic precipitator control 10 further includes the full wave rectifier 17 the output of which is connected to the control winding 18 of the saturable reactor 12, the pulse forming and phase shifting network 20 for providing gating pulses for the silicon controlled rectifiers 19 and 21 of the full wave rectifier 17, current control circuit 22 for controlling the pulse forming and phase shifting network 20 in accordance with precipitator current, and precipitator spark rate control circuit 24 for controlling the full wave rectifier 17 in accordance with the spark rate of the precipitator 16.

In operation electric energy from transformer 14 produces precipitator current in the secondary circuit 15 and a predetermined precipitator spark rate.

If the precipitator current exceeds a predetermined value as sensed by the current control circuit 22 connected to the transformer secondary circuit 15 and to the pulse forming and phase shifting network 20, the network 20 produces a phase shift in the gate signal output thereof to the silicon controlled rectifiers 19 and 21 of full wave rectifier 17 to lower the output current from rectifier 17 thus increasing the impedance of the saturable reactor to ultimately reduce the current in the precipitator circuit.

If the precipitator spark rate becomes excessive the precipitator spark rate control circuit 24 will cause silicon controlled rectifier 19 to stop conducting and thus reduce the current from full wave rectifier 17 through the control winding of the saturable reactor 12 to ultimately reduce the precipitator spark rate.

More specifically the primary circuit 13 of the power transformer 14 for the precipitator 16 includes the transformer primary winding 26 connected across a pair of input electric conductors 30 and 32 from a source of electric energy of for example four-hundred-eighty volts alternating current (not shown) through the alternating current windings 34 and 36 of saturable reactor 12.

The saturable reactor 12 includes the control winding 18. As the current in the control winding 18 is reduced, reactance of the alternating current windings 34 and 36 thereof is increased and the voltage dropped across the saturable reactor in the transformer primary circuit 13 is similarly increased to decrease the voltage applied across transformer primary winding 26 and the precipitator 16. Increase in the reactance of the alternating current windings 34 and 36 of the saturable reactor 12 will thus limit precipitator current and decrease the precipitator spark rate.

The control winding 18 of the saturable reactor 12 is connected directly across the diode 38 in the output circuit of the full wave rectifier 17. Diode 38 serves to prevent transients generated in the primary circuit 13 from damaging the silicon controlled rectifiers 19 and 21 of the full wave rectifier 17.

The rectifier 17 includes the secondary windings 44 and 46 of the power transformer 48 which is connected to a source of alternating electric energy of for example two hundred forty volts (not shown) and includes the primary windings 50 and 52. The rectifier 17 further includes the suppressors 54 and 56 connected as shown in the figure for preventing transients originating in the power supply for transformer 48 from damaging the silicon controlled rectifiers 19 and 21. The suppressors may be of any well known type and may for example be General Electric surge suppressors No. 6RS21SA5D5.

As shown in the figure the silicon controlled rectifiers 19 and 21 are connected in circuit in the full wave rectifier 17. A control terminal of each of the silicon controlled rectifiers 19 and 21 is connected to the pulse forming and phase shifting network 20.

The pulse forming and phase shifting network 20 is provided with power through transformer 48 secondary winding 58 and functions to provide gate pulses on conductors 60 and 62 for causing the silicon controlled rectifiers 19 and 21 to conduct. The phase of the gate pulses relative to the phase of the signal input to the transformer 48 is varied in accordance with the signal provided to the pulse forming and phase shifting network 20 over conductors 64 and 66 of the precipitator current control circuit 22.

The initial gating of the silicon controlled rectifiers 19 and 21 by the pulse forming and phase shifting network 20 is controlled by the bias circuit 68. The bias circuit 68 includes the secondary winding 70 of transformer 48, the rectifier 72 connected to transformer secondary winding 70 and the Zener diode 74. The bias signal is filtered through resistor 76 and capacitor 78. The exact magnitude of the bias from bias circuit 68 is determined by the setting of the wiper arm 80 engaged with resistor 76. Pulse forming and phase shifting networks, such as network 20, are known in the electronic art and may for example be the Vectrol gate drive No. VS 6002-C.

The precipitator current control circuit 22 includes the resistor 82 connected in the transformer secondary circuit 15 of the precipitator 16. Thus, a portion of the precipitator current is shunted through the pulse forming and phase shifting network 20 depending on the setting of wiper arm 83 engaged with resistor 82 to shift the phase of the gate signals provided to the silicon controlled rectifiers 19 and 21 in accordance with the precipitator current.

The precipitator spark rate control circuit 24 includes the inductive signal generator 86 in the transformer primary circuit 13 connected in parallel across the ammeter 88 and the resistor 90 whereby a signal the magnitude of which is proportional to the setting of the wiper arm 91 on resistor 90 is passed through diode 92 and resistor 94 to be stored on capacitor 96 during each spark over in the precipitator 16. On the spark rate becoming higher than desired as selected by the setting of the wiper arm 91, the charge on the capacitor 96 will cause the Zener diode 98 to break down and the capacitor 96 to discharge through Zener diode 98, resistor 100 and silicon controlled rectifier 102, causing the silicon controlled rectifier 102 to conduct.

Conduction of the silicon controlled rectifier 102 will cause the silicon controlled rectifier 19 to stop conducting, whereby the output of the rectifier 17 will be reduced to reduce the spark rate of the precipitator below the predetermined spark rate.

In over-all operation of the automatic precipitator control 10 with the precipitator 16 operating at optimum current and optimum spark rate, the pulse forming and phase shifting network 20 provides gate pulses to the silicon controlled rectifiers 19 and 21 so that the full wave rectifier 17 has an output through the saturable reactor control winding 18 sufficient to maintain the reactance of the saturable reactor field windings 34 and 36 to produce the optimum precipitator current or spark rate.

The initial gate pulses from the pulse forming and phase shifting network 20 are selected by positioning of the wiper arms 80 in the biasing circuit 68 of the pulse forming and phase shifting network 20.

On increase of the precipitator current the signal fed to the pulse forming and phase shifting network 20 from the precipitator current control circuit 22 due to the setting of wiper arm 83, which determines the desired precipitator current, will be increased to change the phase of the output gating signal of the pulse forming and phase shifting network 20 to the silicon controlled rectifiers 19 and 21 so that the output of the rectifier 17 will provide less current through the control winding 18 of the saturable reactor 12, thus providing a greater reactance in the field windings 34 and 36 of the saturable reactor 12 to reduce the precipitator current to the predetermined current.

Should the spark rate of the precipitator exceed the predetermined amount as determined by the setting of the wiper arm 91 in the spark rate control circuit 24, the signals from the inductive pick-up 86 integrated by the capacitor 96 will fire the silicon controlled rectifier 102 to cut off the silicon controlled rectifier 19, reducing the current output of the rectifier 17 through the control winding 18 of the saturable reactor 12 to bring the precipitator spark rate back to the predetermined optimum precipitator spark rate.

The current and spark rate control circuits 22 and 24 operate simultaneously to provide optimum current or spark rates for the precipitator 16 at all times during operation thereof.

While one embodiment of the present invention has been disclosed in detail, it will be understood that other embodiments and modifications thereof are contemplated. It is the intention to include all modifications and embodiments of the invention as are defined by the appended claims within the scope of the invention.

What I claim as my invention is:

1. An automatic precipitator control for regulating the precipitator current and spark rate of a precipitator including primary and secondary precipitator transformer circuits comprising a saturable reactor having alternating current windings in the primary precipitator transformer circuit, a full wave rectifier having one side for rectifying negative going signals and one side for rectifying positive going signals, a saturable reactor control winding connected to the output of the full wave rectifier, means for varying the output of both sides of the full wave rectifier in accordance with precipitator current and means for cutting off one side of the full wave rectifier in response to excessive precipitator spark rate.

2. An automatic precipitator control for regulating the precipitator current and spark rate of a precipitator including primary and secondary precipitator transformer circuits comprising a saturable reactor having alternating current windings in the primary precipitator transformer circuit, a pair of silicon controlled rectifiers connected in a full wave rectifier circuit, a saturable reactor control winding connected to the output of the full wave rectifier and means for varying the output of both of the silicon controlled rectifiers of the full wave rectifier in response to the precipitator current and for cutting off one of the silicon controlled rectifiers of the full wave rectifier circuit in response to precipitator spark rate.

3. Structure as set forth in claim 2 wherein the means for varying the output of the full wave rectifier in response to the precipitator current comprises a pulse forming and phase shifting network connected to control electrodes of the silicon controlled rectifiers for forming actuating pulses for the silicon controlled rectifiers and means responsive to the precipitator current for shifting the phase of the actuating pulses.

4. Structure as set forth in claim 3 wherein the means responsive to the precipitator current comprises a resistor in series with the secondary precipitator transformer circuit and means for passing a selected portion of the signal across the resistor to the pulse forming and phase shifting network.

5. Structure as set forth in claim 2 wherein the means for varying the output of the full wave rectifier in response to the precipitator spark rate comprises means for developing an integrated signal proportional to precipitator spark rate and means for applying the integrated signal to one of the silicon controlled rectifiers only after a predetermined spark rate is exceeded to cut off one-half of the full wave rectifier circuit.

6. Structure as set forth in claim 5 wherein the means for developing a signal proportional to the precipitator spark rate comprises an inductive signal developing member operably associated with the primary precipitator transformer circuit for developing pulses at the precipitator spark rate and means for integrating the developed pulses connected to the signal developing member.

7. Structure as set forth in claim 6 wherein the means for applying the integrated signal to one of the silicon controlled rectifiers comprises a third silicon controlled rectifier, a Zener diode connected in series with the integrating means and the third silicon controlled rectifier, the integrating means producing a signal of predetermined magnitude and means connecting the third silicon controlled rectifier to one of the other silicon controlled rectifiers for rendering the one of the other silicon controlled rectifiers non-conductive on conduction of the third silicon controlled rectifier.

8. An automatic precipitator control for regulating the spark rate of a precipitator including primary and secondary precipitator transformer circuits comprising a saturable reactor having field windings in the primary precipitator transformer circuit, a pair of silicon controlled rectifiers connected in a full wave rectifier, a saturable reactor control winding connected to the output of the full wave rectifier and means for cutting off one of the silicon controlled rectifiers in the full wave rectifier in response to the precipitator spark rate.

9. Structure as set forth in claim 8 wherein the means for varying the output of the full wave rectifier comprises means for developing a signal proportional to the precipitator spark rate including an inductive pick-up for developing pulses at the precipitator spark rate operably associated with the primary transformer circuit of the precipitator, means for integrating the sensed pulses, a Zener diode, a third silicon controlled rectifier connected in series with the integrating means and the Zener diode for actuation on the integrating means producing a signal of predetermined magnitude and means connecting the third silicon controlled rectifier to one of the other silicon controlled rectifiers for rendering the one silicon controlled rectifier non-conductive on conduction of the third silicon controlled rectifier.

10. An automatic precipitator control for regulating the current and spark rate of a precipitator which precipitator includes a pair of spaced apart electrodes, a transformer having a primary and secondary winding, the primary winding of which is connected to a source of electrical energy, the secondary winding of which is connected through a rectifier to one of said electrodes and through a precipitator current resistor to the other of said electrodes, said control including a saturable reactor having a control winding and a field winding in series with the primary winding of said transformer, a full wave rectifier, a precipitator spark rate resistor connected in parallel with the control winding of the saturable reactor between said other electrode and the rectifier, said rectifier including a pair of silicon controlled rectifiers, a transformer secondary winding extending between one electrode of each of the silicon controlled rectifiers, a second electrode of the silicon controlled rectifiers being connected together and between the spark rate resistor and control winding of the saturable reactor, a pulse forming and phase shifting network, means for biasing the pulse forming and phase shifting network, means for sensing a portion of the precipitator current across the current resistor and passing it to the pulse forming and phase shifting network, means for feeding pulses from the pulse forming and phase shifting network to the control electrodes of the silicon controlled rectifiers to determine the time during each cycle of the full wave rectifier that the silicon controlled rectifiers are turned on, a third silicon controlled rectifier having one electrode connected to the control electrode of one of the pair of silicon controlled rectifiers and a second electrode connected to the second electrode of the one of the pair of silicon controlled rectifiers, a diode, a resistance and a Zener diode connected in series between the control electrode of the third silicon controlled rectifier and the spark rate resistor and a capacitor connected between the diode and Zener diode at one end and the second electrode of the third silicon controlled rectifier at the other end.

11. Structure as set forth in claim 10 and further including means for varying the portion of precipitator current sensed.

12. Structure as set forth in claim 10 and further including means for varying the connection of the diode to the spark rate resistor.

13. Structure as set forth in claim 10 and further including means for varying the bias applied to the pulse forming and phase shifting network.

References Cited
UNITED STATES PATENTS

| | | | |
|---|---|---|---|
| 2,742,104 | 4/1956 | Hall | 55—105 X |
| 2,782,867 | 2/1957 | Hall | 55—139 |
| 2,943,697 | 7/1960 | Little | 55—105 |
| 2,992,699 | 7/1961 | Jarvinen | 323—66 X |
| 3,048,955 | 8/1962 | Little | 323—66 X |
| 3,147,094 | 9/1964 | Hall et al. | 55—105 |
| 3,173,772 | 3/1965 | Gelfand | 55—105 |

JOHN F. COUCH, *Primary Examiner.*

A. D. PELLINEN, *Assistant Examiner.*